Patented Apr. 18, 1950

2,504,207

UNITED STATES PATENT OFFICE 2,504,207

SMEAR FOR SCREWWORM CONTROL

Clarence A. Littler, Wilmington, Del., assignor to E. I. du Pont de Nemours & Company, Wilmington, Del., a corporation of Delaware No Drawing. Application May 7, 1948, Serial No. 25,810

8 Claims. (Cl. 167—53.2)

This invention relates to the control of screwworm infestation of livestock and is more particularly directed to compositions for such screwworm control which are emulsions in the form of a smear containing an aqueous continuous phase and a solution of diphenylamine in benzene as the dispersed phase.

Screwworm is the name given to the larvae of blowflies of the genus Cochliomyia. It is a costly pest to livestock producers in certain areas. The blowfly lays its eggs in or near scratches or wounds on the livestock and the eggs hatch into the screwworm which rapidly infests and expands the wounds frequently killing the livestock if not checked.

A mixture of diphenylamine and benzene is known to be effective for killing and preventing infestation by screwworm. For application to livestock, this mixture is usually incorporated with a powdered solid to give a paste which can be applied to wounds on livestock with a brush or daub. One such formulation, which is recommended by the Department of Agriculture, contains lampblack as the powdered solid and is designated as "Smear 62."

These paste-type compositions tend to separate on standing, the solid settling. The compositions exhibit a "wick action," benzene creeping up the inside of the container and out and evaporating unless the containers are kept very tightly sealed. The compositions also appear to have some irritating action on the flesh of the animal being treated and the healing of the wound is retarded. The recommended lampblack containing formulation, unhappily for the consumer, leaves a messy discolorization of everything it touches. The paste-type compositions are apt to harden upon exposure to the air and are rather difficult to apply in a way to effect thorough and completely satisfactory contact with the wound.

It is an object of this invention to provide compositions which are easily applied and which are miscible enough with body fluids to permit effective and easy application to an open wound on livestock. A further object is to provide compositions in which the diphenylamine is maintained in intimate contact in the form of tightly adhering deposits of crystals. It is a still further object to provide compositions which are pleasing in appearance and which are stable at temperatures as low as 15° F. A still further object is to provide compositions which are effective in killing larvae in the wound at the time of treatment, in protecting wounds against reinfestation, and in reducing the time required for the wounds to heal. It is a still further object to provide compositions which have a flash point about 45° F. higher than the paste-type formulations used commercially heretofore, and thus less subject to ignition. It is a still further object to provide processes for the easy and effective control of screwworm in livestock. Still further objects will become apparent hereinafter.

The foregoing and other objects of the invention are attained by the use for the control of screwworm of a smear comprising an emulsion containing an aqueous continuous phase and a solution of diphenylamine in benzene as the dispersed phase. Such a composition is miscible with body fluids, is easily applied with a brush, can readily be removed from the hands or clothing if spilled, and has decreased objectionable odor because of the lower vapor pressure. The comparative ease of application is particularly desirable because the product is normally used by farmhands and other workmen.

Preferred compositions of the invention include an emulsifying agent for the purpose of establishing dispersion in water of a solution of diphenylamine in benzene, an emulsion stabilizer for the purpose of maintaining the emulsion thus produced in a stable form and a thickening agent to give the emulsion a smear or mayonnaise-like consistency.

Considering preferred compositions of the invention more specifically, it is first to be noted that benzene and diphenylamine are present in the smear compositions of the invention in the proportions of about 1 to 2 parts by weight of benzene for each part by weight of diphenylamine. Still more preferably the benzene and diphenylamine are used in approximately equal amounts. Together the benzene and diphenylamine comprise from 40 percent thru 80 percent by weight of the smear. Thus on a percentage basis each of these ingredients will be present in amount of about 20 to 40% and preferably about 30% by weight each.

In preparing the smears of the invention, the diphenylamine is ordinarily first dissolved in the benzene and the resulting solution is emulsified in water. In order to effect the emulsification, the means normally used in the art for forming such emulsions may be employed. For this purpose, an emulsifying agent is normally included in small amount and there may be used, for instance, any of the emulsifying agents for aqueous systems, such as triethanolamine oleate, alkali caseinates, carboxymethyl cellulose, polyvinyl alcohol, diglycol laurate, methyl cellulose, diglycol stearate, monoglycol stearate or laurate, mannitan or sorbitan monolaurate, glue, blood albumin, sodium dioctyl sulfosuccinate and sodium alkylnaphthalene sulfonates.

The emulsifying agents are normally used at the rate of only a few tenths of a per cent if of the ionic type such as tri-ethanolamine oleate or alkali caseinate, or up to 1 or 2% if of the non-ionic type.

The preferred emulsifying agent for smears of the present invention is sodium lauryl sulfate. Like those of the other ionic emulsifying agents mentioned above, it is used at the rate of a fraction of a per cent in the smear composition, the minimum effective amount being easily determined by a few trials.

While the aforementioned emulsifying agents are effective in aiding the formation of an emulsion of a solution of diphenylamine in benzene in aqueous medium, they vary considerably in their ability to maintain the emulsion thus formed. It is preferred, therefore, if certain of the emulsifying agents such as sodium dioctyl sulfosuccinate, sodium alkylnaphthalene sulfonate, or sodium lauryl sulfate are used, to include an emulsion stabilizer in the smears in order to insure that the emulsion will not "break" on long standing. With other of the emulsifying agents such as tri-ethanolamine oleate, alkali caseinates, carboxymethyl cellulose, polyvinyl alcohol, diglycol laurate, methyl cellulose, diglycol stearate, monoglycol stearate or laurate, mannitan or sorbitan monolaurate, glue and blood albumin, it is generally not necessary to include an emulsion stabilizer since these materials serve both as emulsifiers and stabilizers.

The preferred emulsion stabilizers are those compounds having a long chain and a polar hydrophilic head such as lorol alcohol, oleic acid, nonylglycolate, stearylamine and similar long chain alcohols, acids, and amines. The preferred emulsion stabilizer for the smears of the present invention is cetyl alcohol and this emulsion stabilizer is particularly effective in compositions where sodium lauryl sulfate is used as an emulsifying agent in effecting the initial emulsification. The emulsion stabilizers are normally used in small amounts just as in the case of the emulsifying agents previously discussed.

The smear compositions of the invention are preferably thickened, as required, with any suitable thickening material for aqueous medium in order to give the preferred "body" or mayonnaise-like consistency. There may be used, for instance, high molecular weight compounds (M. W.=at least 1,000) which have a large number of hydrophilic groups such as hydroxyl (HO—). For example, methyl cellulose, carboxymethyl cellulose, or polyvinyl alcohol which were mentioned above as emulsifying agents may be used. As thickening agents, however, considerably larger amounts would be needed to give the desired increase in thickness of the emulsion. There may be used other thickening agents such as Karaya gum, tragacanth, algin, swollen starch or modified starch such as methyl starch.

The amount of thickening agent required will vary with the particular material selected but will easily be determined by trial and it is that quantity which is needed to give the composition a moderately thick consistency so that it will remain in place on the animal in the form of a fairly thick layer. The thickening agent also acts to inhibit "blooming" of diphenylamine crystals as the smear dries and benzene evaporates.

The preferred thickening agent is bentonite and it is preferred to use from about 3 thru 6% of bentonite in the smear. Other bentonitic type clays characterized by swelling in water are also suitable.

According to a preferred embodiment of the invention, a small amount of urea is included in the smear compositions. I have found that the presence of urea prevents the emulsion from breaking even at temperatures as low as 15° F. In the absence of urea, the smears are not resistant to emulsion break at temperatures below about 32° F. In addition to protecting the emulsion type smears of the invention at low temperatures, urea is believed to have a beneficial action in promoting the healing of wounds to which the smear has been applied. The urea is used in amount up to about 10% by weight of the smear and still more preferably the smear composition contains from about 3.5 to 6.5% by weight of urea.

While the use of urea alone is effective in preventing emulsion break at temperatures as low as 15° F., its inclusion causes the smear to dry a little too slowly on application. This tendency to slow drying is overcome by adding ethanol along with the urea. Ethanol alone is ineffective in preventing emulsion break at temperatures as low as 15° F. but in combination with urea, effective protection against emulsion break at these low temperatures and a preferred drying rate are obtained. This combination of urea and ethanol is used in amount up to a combined total of about 10% by weight of the smear, the urea comprising at least 3.5% by weight of the smear.

In order that the invention may be better understood, reference should be had to the following illustrative examples:

*Example I*

A solution is first made up by dissolving diphenylamine and cetyl alcohol in benzene. These are present at the following rates based upon the total weight of finished composition.

| | Per cent |
|---|---|
| Diphenylamine | 30 |
| Benzene | 30 |
| Cetyl alcohol | 0.75 |

A separate water-phase batch is then made up by dissolving sodium lauryl sulfate and borax in water, and bentonite is dispersed in this water phase. These ingredients are used in the following amounts by weight based again upon the weight of the total composition.

| | Per cent |
|---|---|
| Water | 33.725 |
| Sodium lauryl sulfate | 0.375 |
| Borax | 0.15 |
| Bentonite | 5.0 |

The water solution of sodium lauryl sulfate and borax with bentonite dispersed therein is then agitated while the solution of diphenylamine and cetyl alcohol in benzene is added thereto. A smear in the form of an emulsion is obtained. This smear was applied to livestock and excellent results were obtained in the control of screwworm.

The borax puts the composition a little on the alkaline side and it is preferred to use a little borax or another mild alkali for this purpose.

In mixing the organic solution and the water phase as above to prepare the emulsion type smear vigorous agitation should be used in order to obtain a dispersion of minute droplets of the organic phase in the aqueous continuous phase and such a physical state is suitably assured by passing the mixture thru a colloid mill or homogenizer.

*Example II*

Diphenylamine and cetyl alcohol are dissolved in benzene. The chemicals are present at the following rates based upon the total weight of finished smear.

| | Per cent |
|---|---|
| Diphenylamine | 30 |
| Cetyl alcohol | 0.75 |
| Benzene | 25 |

Sodium lauryl sulfate, urea, ethanol and borax are then dissolved in water. These materials are used in the following amounts by weight based again upon the weight of the total smear.

| | Per cent |
|---|---|
| Water | 25.45 |
| Sodium lauryl sulfate | 0.37 |
| Urea | 5.28 |
| Denatured ethanol | 4.0 |
| Borax | 0.15 |

The last mentioned aqueous solution is agitated vigorously and the first mentioned solution of diphenylamine and cetyl alcohol in benzene is added thereto. A rather thin emulsion smear is obtained.

Finely-divided bentonite (325 mesh) is added with stirring to benzene, these materials being used at the following rates based upon the total weight of the finished smear.

| | Per cent |
|---|---|
| Bentonite | 4 |
| Benzene | 5 |

This suspension or slurry of bentonite in benzene is then added slowly to the thin emulsion smear, described above, while agitating to give a uniform composition thickened to a mayonnaise-like consistency.

The emulsion type smear of this composition is stable at a temperature as low as 15° F. The composition is easily applied with a brush and is otherwise well-suited for use in the control of screwworm.

I claim:

1. A smear for screwworm control comprising an emulsion containing an aqueous continuous phase and a solution of diphenylamine in benzene as the dispersed phase.

2. A smear for screwworm control comprising an emulsion containing an aqueous continuous phase, a solution of diphenylamine in benzene as the dispersed phase, and a thickening agent for the emulsion, said dispersed phase consisting of about 1 to 2 parts by weight of benzene for each part by weight of diphenylamine and comprising from about 40 thru 80 percent by weight of the smear.

3. A smear for screwworm control comprising an emulsion containing an aqueous continuous phase, a solution of diphenylamine in benzene as the dispersed phase, and about 3 thru 6% by weight of bentonite.

4. A smear for screwworm control comprising an emulsion containing an aqueous continuous phase, a solution of diphenylamine in benzene as the dispersed phase, an emulsifying agent, and about 3 thru 6% by weight of bentonite, said dispersed phase consisting substantially of about 1 to 2 parts by weight of benzene for each part by weight of diphenylamine and comprising from about 40 thru 80 percent by weight of the smear.

5. A smear for screwworm control comprising an emulsion containing an aqueous continuous phase, a solution of diphenylamine in benzene as the dispersed phase, and urea in amount up to about 10% by weight of the smear.

6. A smear for screwworm control comprising an emulsion containing an aqueous continuous phase, a solution of diphenylamine in benzene as the dispersed phase, and containing additionally urea and ethanol in amount up to a combined total of about 10% by weight of the smear, the urea comprising at least 35% by weight of the total amount of urea and ethanol present.

7. A smear for screwworm control comprising an emulsion containing an aqueous continuous phase and a solution of diphenylamine in benzene as the dispersed phase, said smear having approximately the following composition:

| | Per cent |
|---|---|
| Benzene | 30 |
| Diphenylamine | 30 |
| Water | 33.725 |
| Bentonite | 5.0 |
| Sodium lauryl sulfate | 0.375 |
| Cetyl alcohol | 0.75 |
| Borax | 0.15 |

8. A smear for screwworm control comprising an emulsion containing an aqueous continuous phase and a solution of diphenylamine in benzene as the dispersed phase, said smear having approximately the following composition:

| | Per cent |
|---|---|
| Benzene | 30 |
| Diphenylamine | 30 |
| Water | 25.45 |
| Bentonite | 4.0 |
| Urea | 5.28 |
| Ethanol | 4.0 |
| Sodium lauryl sulfate | 0.37 |
| Cetyl alcohol | 0.75 |
| Borax | 0.15 |

CLARENCE A. LITTLER.

REFERENCES CITED

The following references are of record in the file of this patent:

UNITED STATES PATENTS

| Number | Name | Date |
|---|---|---|
| 426,355 | Youngkin | Apr. 22, 1890 |
| 1,813,109 | Banks | July 7, 1931 |

OTHER REFERENCES

Parish, Jour. of Econ. Ent., vol. 35, February 1942, pages 70–73.

Poucher, Perfumes, Cosmetics and Soaps, 6th Ed. (1942), vol. 3, page 129.

U. S. Dispensatory, 24th ed. (1947), page 1258.

Drug and Cosmetic Industry, Nov. 1943, page 553.

Melvin, USDA Bureau of Entomology and Plant Quarantine, Bulletin E540, May 1941; A New Remedy for the Prevention and Treatment of Screwworm Infestations of Livestock, pages 1 to 4.

Diseases of Cattle (1942), page 455.